United States Patent [19]

Kodera et al.

[11] Patent Number: 5,519,528
[45] Date of Patent: May 21, 1996

[54] METHOD OF OPTICAL FIBER COMMUNICATION

[75] Inventors: Motoyuki Kodera, Kawanishi; Seiji Minamihara, Itami, both of Japan

[73] Assignee: Mitsubishi Denki Kabushiki Kaisha, Tokyo, Japan

[21] Appl. No.: 251,184

[22] Filed: May 31, 1994

[30] Foreign Application Priority Data

Jun. 7, 1993 [JP] Japan .................................. 5-135565

[51] Int. Cl.⁶ .................... H04B 10/12; H04B 10/18
[52] U.S. Cl. .................... 359/161; 359/173; 359/181; 359/188
[58] Field of Search .................... 359/161, 180, 359/187, 188, 173

[56] References Cited

U.S. PATENT DOCUMENTS

| | | | |
|---|---|---|---|
| 4,261,639 | 4/1981 | Kogelnik et al. | 350/96.15 |
| 4,969,710 | 11/1990 | Tick et al. | 350/96.30 |
| 5,355,240 | 10/1994 | Prigent et al. | 359/161 |
| 5,373,382 | 12/1994 | Pirio | 359/161 |
| 5,373,384 | 12/1994 | Hebert | 359/161 |

FOREIGN PATENT DOCUMENTS

| | | | |
|---|---|---|---|
| 531210 | 9/1992 | European Pat. Off. | 359/161 |
| 0524758 | 1/1993 | European Pat. Off. | 359/161 |
| 0532388 | 3/1993 | European Pat. Off. | 359/161 |
| 0590633 | 4/1994 | European Pat. Off. | 359/161 |
| 2681745 | 3/1993 | France | 359/188 |
| 0150336 | 8/1985 | Japan | 359/161 |
| 63-017581 | 1/1988 | Japan . | |

OTHER PUBLICATIONS

Vanderwall, "Suppression of some antifacts of model noise in fiber Optic systems" Optics Letters, vol. 4, #9, pp. 295–296, Sep. 1979.

Ibrahim et al, "Fibre–Equaliser Second Order Distortion Compensation in 1–55 μm Lightwave CATV Transmission System", Electronic Letters, Feb. 4, 1993, vol. 29, No. 3, pp. 315–317.

*Primary Examiner*—Leslie Pascal
*Attorney, Agent, or Firm*—Leydig, Voit & Mayer

[57] ABSTRACT

An optical fiber communication apparatus includes a main optical fiber having dispersive characteristics; a semiconductor laser diode for outputting an optical signal transmitted through the main optical fiber; a photodiode for receiving the optical signal output from the main optical fiber and a dispersion canceling short distance optical fiber having a total dispersion approximately the same as and in a reverse phase from the total dispersion of the main optical fiber at the wavelength of the optical signal, correcting the total dispersion produced by the main optical fiber and located at one of the input and output end of the main optical fiber. An optical signal traveling through the signal transmission line becomes a reformed rectangular waveform at the output end so that reading errors can be eliminated, resulting in highly reliable communication.

2 Claims, 5 Drawing Sheets

METHOD OF OPTICAL FIBER COMMUNICATION

FIELD OF THE INVENTION

The present invention relates to an optical fiber communication apparatus and, more particularly, to correcting the characteristics of an optical fiber and a light emitting element used in the apparatus.

BACKGROUND OF THE INVENTION

Figure 4:
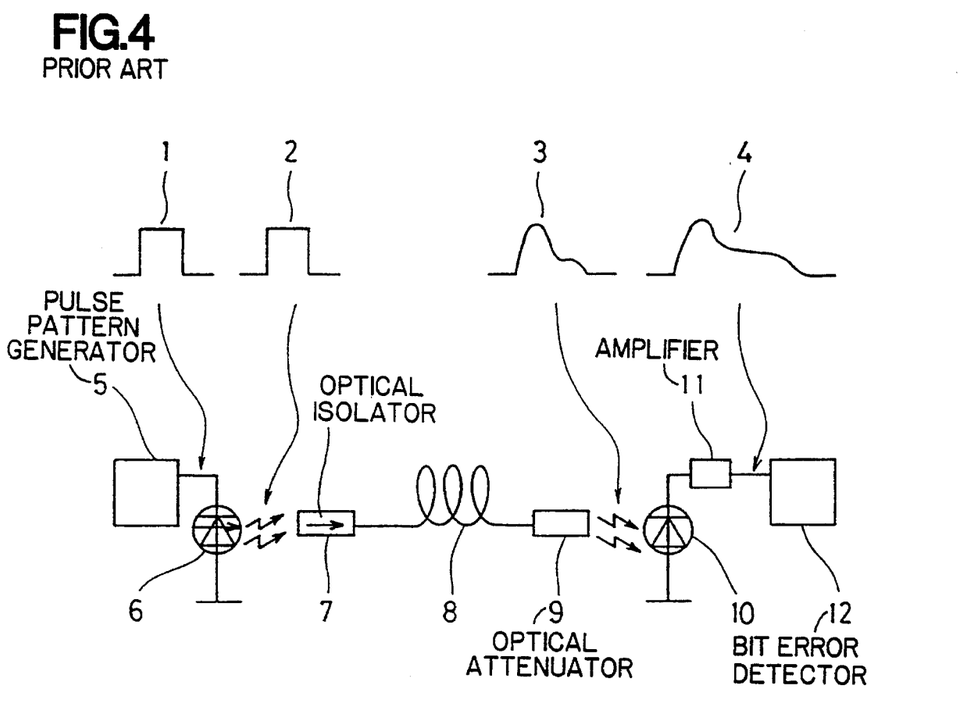
FIG. 4 is a diagram illustrating an optical fiber communication apparatus according to the prior art.

FIG. 4 is a diagram illustrating a conventional optical fiber communication system. In this system, an optical signal is transmitted through an optical fiber having dispersive characteristics. In FIG. 4, a pulse pattern generator 5 generates an input electrical signal waveform 1. A semiconductor laser diode (hereinafter also referred to as LD) 6 converts an input electrical signal waveform I into an input optical signal waveform 2. An isolator 7 limits the transmission of the optical signal to only one direction. A main optical fiber 8 several tens to several hundreds of km in length having dispersive characteristics is provided for transmitting a communication signal. An optical attenuator 9 attenuates the optical signal. A photodiode (hereinafter may be also referred to as PD) 10 converts the output optical signal waveform 3 into an output electrical signal waveform 4. An amplifier 11 amplifies the output electrical signal waveform 4. A bit error rate measuring apparatus 12 measures the transmission error rate of the optical signal transmitted through the main optical fiber 8 in response to the output of the amplifier 11.

The input electrical signal waveform 1 having a rectangular waveform is generated by the pulse pattern generator 5 and converted into the input optical signal waveform 2 having a rectangular waveform by the semiconductor laser diode 6. The input optical signal waveform 2 is input to the main optical fiber 8 through the isolator 7. The optical signal transmitted through the main optical fiber 8 having an entire length of several tens to several hundreds of km, for example, 40 km, is output to the photodiode 10 through the optical attenuator 9. This output optical signal waveform 3 is dispersed due to the dispersive characteristics of the main optical fiber 8, resulting in a smoothly-sloping and wide signal waveform as shown in FIG. 4. This output optical signal is received by the photodiode 10 and converted into an electrical signal. The electrical signal is amplified by the amplifier 11, thereby becoming the output electrical signal waveform 4 that is smoothly sloped and broadened due to the response characteristic of PD 10, as shown in FIG. 4. On the basis of this waveform 4, a code error rate is measured by the code error rate measuring apparatus 12. In this way, optical communication is carried out.

Figure 5A:
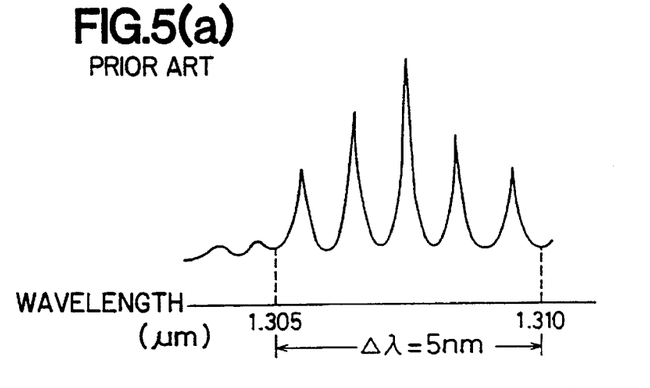
FIGS. 5(a)–5(d) are diagrams illustrating an oscillation spectrum, signal waveforms, and dispersive characteristics of the optical signal in the optical fiber communication apparatus of FIG. 4.
Figure 5B:
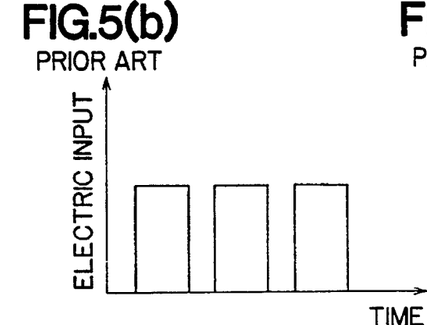
Figure 5C:
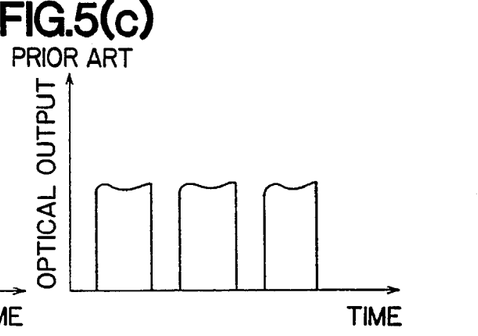
Figure 5D:
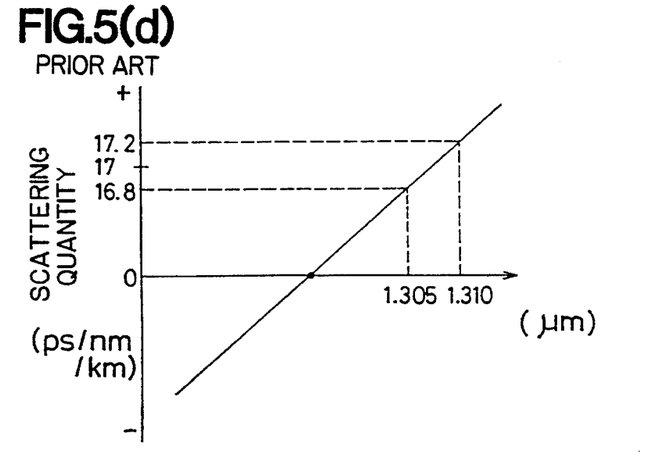

FIG. 5(a) shows an oscillation spectrum of the semiconductor laser diode 6 driven at a transmission speed of 2.5 Gb/s. The spectrum has five peaks within a range of wavelengths, $\Delta\lambda=5$ nm, between 1.305 and 1.310 µm. The semiconductor laser diode 6 is driven by a pulsed signal having a completely rectangular waveform, as shown in FIG. 5(b), and outputs a pulsed optical signal having an approximately rectangular waveform, although the optical signal which is an oscillation output of the laser diode has a little distortion, as shown in FIG. 5(c), due to relaxation oscillation of the laser diode 6. Here, this pulsed optical signal having a rectangular waveform is produced by respective modes of the five oscillation peaks shown in FIG. 5(a) and pulsed signals having a completely rectangular waveform are synthesized together. This pulsed optical signal is transmitted through the main optical fiber 8 having the dispersive characteristics shown in FIG. 5(d).

The dispersion is produced by different transmission times of the light traveling through the main optical fiber 8 depending on wavelength, which gives different transmission times relative to the transmission time of a signal having a reference wavelength, i.e., the delay time as a relative value. In other words, the dispersion indicates a delay in the transmission of the pulsed optical signal relative to a signal having a wavelength at which the dispersion is zero. Therefore, the dispersive characteristic of the main optical fiber 8 has a positive inclination as a function of wavelength. Suppose that the dispersion of the main optical fiber 8 is 0 ps/nm/km at a wavelength of 1.250 µm and it is 17 ps/nm/km at the center wavelength for a bandwidth of 1.305 to 1.310 µm. When the light having a bandwidth of $\Delta\lambda=5$ nm, shown in FIG. 5(a), is transmitted through the main optical fiber 8 of 40 km length, the maximum delay is $$17 \text{ (ps/nm/km)} \times 5 \text{ (nm)} \times 40 \text{ (km)} = 3400 \text{ ps.}$$

This delay is inherent in the rectangular waveform of the pulsed optical signal at the output side, and the output optical signal waveform 3 at the receiver is a distorted waveform having a width larger by 3400 ps than the input optical signal waveform 2 at the transmitter.

The prior art optical fiber communication apparatus has the described construction in which the input optical signal waveform 2 having a rectangular waveform that is converted into an optical signal travels through the main optical fiber 8 over an entire length of several tens to several hundreds of km. The output optical signal waveform 3 is not the same as the input optical signal waveform 2 due to the dispersion of the main optical fiber 8, Instead, the output waveform is smoothly sloping, thereby increasing the bit error rate.

SUMMARY OF THE INVENTION

It is an object of the present invention to provide an optical fiber communication apparatus that provides an output optical signal waveform having the same waveform as the input optical signal waveform including no smoothly sloping part and produces no reading errors due to the smooth sloping of the signal waveform at the output.

Other objects and advantages of the present invention will become apparent from the detailed description given hereinafter; it should be understood, however, that the detailed description and specific embodiments are given by way of illustration only since various changes and modifications within the scope of the invention will become apparent to those skilled in the art from the detailed description.

According to a first aspect of the present invention, an optical fiber communication apparatus includes a dispersion-cancelling short distance optical fiber that has a total dispersion approximately the same as and in a reverse phase to that of a main optical fiber at the wavelength of an optical signal to be transmitted and corrects the total dispersion of the main optical fiber, provided at a prior or latter stage of the main optical fiber that is employed as a signal transmission line having dispersive characteristics. Therefore, the optical signal traveling through the signal transmission line becomes a reformed rectangular waveform at the receiver whereby reading errors due to a smooth sloping part of the output signal waveform can be eliminated, resulting in highly reliable communication.

According to a second aspect of the present invention, an optical fiber communication apparatus includes a semiconductor laser diode driven by an electrical signal that is distorted, thereby outputting an optical signal having a rectangular waveform at the receiver of the main optical fiber that is affected by the dispersive characteristics of the main optical fiber. The waveform of the optical signal output from the semiconductor laser diode becomes a reformed rectangular waveform when it is output at the receiver of the main optical fiber, after traveling through the main optical fiber, whereby reading errors due to a smooth sloping part of the output signal waveform can be eliminated, resulting in highly reliable communication.

According to a third aspect of the present invention, an optical fiber communication apparatus includes a semiconductor laser diode driven by an electrical signal having a transmission speed on the order of Gb/s, generating a relaxation oscillation, thereby outputting an optical signal having a significantly distorted waveform; a signal transmission line having a waveform reforming optical fiber having such dispersive characteristics that the waveform of the optical signal is reformed to a rectangular waveform at an output end of the waveform reforming optical fiber, the semiconductor laser diode and the waveform reforming optical fiber being part of an optical waveform reforming apparatus. Therefore, the distorted waveform of the optical signal output from the semiconductor laser diode becomes a rectangular waveform that is reformed when it is output at the receiver of the signal transmission line whereby reading errors due to a smoothly sloping part of the output signal waveform can be eliminated, resulting in highly reliable communication.

DETAILED DESCRIPTION OF PREFERRED EMBODIMENTS

Embodiment 1

Figure 1A:
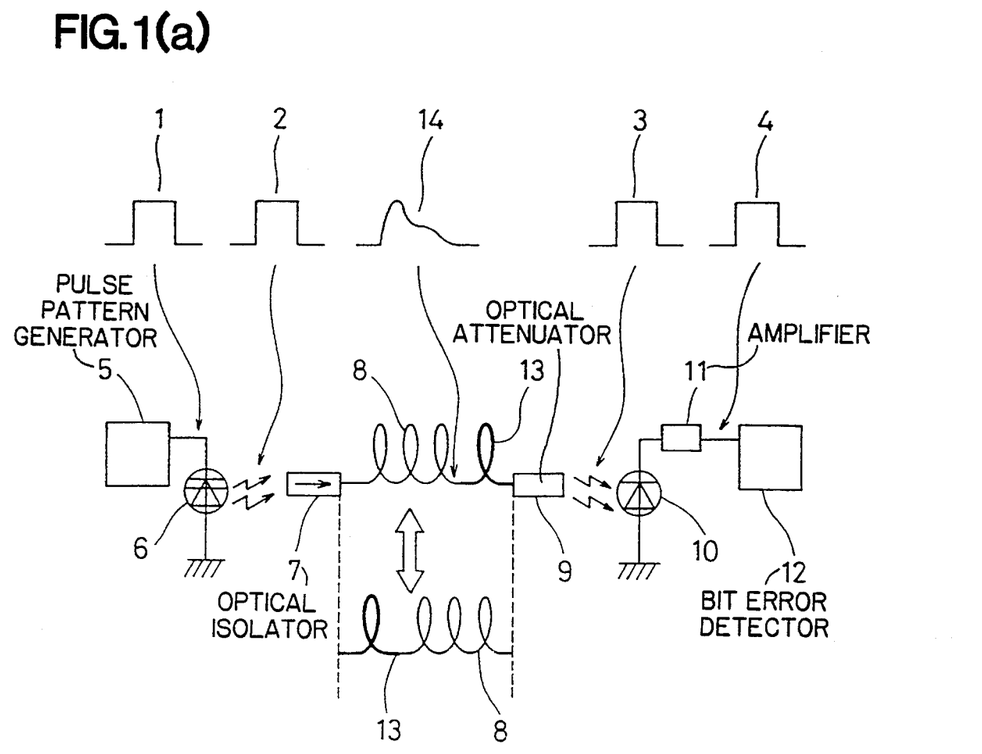
FIGS. 1(a) and 1(b) are diagrams illustrating an optical fiber communication apparatus employing a dispersion cancelling short distance optical fiber according to a first embodiment of the present invention.

FIG. 1(a) shows an optical fiber communication apparatus according to a first embodiment of the present invention. In FIG. 1(a), a pulse pattern generator 5 generates the input electrical signal waveform 1. A semiconductor laser diode 6 converts the input electrical signal waveform 1 into the input optical signal waveform 2. The laser is driven at a transmission speed of, for example, 2.5 Gb/s, and its oscillation spectrum has five oscillation peaks within a range of wavelengths, $\Delta\lambda=5$ nm, between 1.305 and 1.310 µm. An isolator 7 limits the transmission of the optical signal to only one direction. A main optical fiber 8 having an entire length of several tens to several hundreds of km, for example, 40 km, and having dispersive characteristics is a signal transmission line for transmitting a communication signal. The input optical signal waveform 2 is subjected to the dispersive characteristics while traveling through the main optical fiber 8, thereby becoming an optical signal waveform 14. A dispersion cancelling short distance optical fiber (dispersion correcting optical fiber) 13 is connected to a prior or latter stage of the main optical fiber 8 by a coupling method, such as fusion, and has a total dispersion that is approximately the same as and in a reverse phase to that of the main optical fiber 8 at a wavelength within a range between 1.305 and 1.310 µm. This optical fiber 13 also has an entire length of about one fifth to one tenth of the length of the main optical fiber 8. A photodiode 10 converts the output optical signal waveform 3 into the output electrical signal waveform 4. An amplifier 11 amplifies the output electrical signal waveform 4.

Figure 1B:
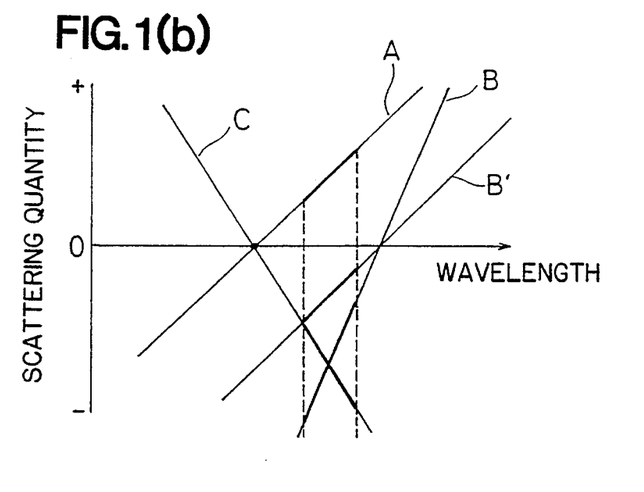

FIG. 1(b) shows the dispersive characteristics of the main optical fiber 8 and of the dispersion cancelling short distance optical fiber 13. Reference character A represents the dispersive characteristics of the main optical fiber 8, which is the same as that in FIG. 5(d), and reference character B represents the dispersive characteristics of the dispersion cancelling short distance optical fiber 13. When an optical fiber having the dispersive characteristics B', which has the same inclination as the dispersive characteristics of the main optical fiber 8, is employed as an optical fiber for cancelling dispersion, an optical fiber of the same length as that of the main optical fiber is required. In this embodiment, however, since a short distance optical fiber having an entire length of several cm to several meters is employed as the dispersion cancelling short distance optical fiber 13, an optical fiber having the dispersive characteristics B with a large inclination is employed to cancel the dispersive characteristics of the main optical fiber 8. Here, an optical fiber having dispersive characteristics C with a negative inclination may be employed as the correcting optical fiber. Additionally, in the formation of this correcting optical fiber, the wavelength and inclination of the dispersion characteristics at which the dispersion quantity is zero can be varied according to the amount of an impurity ($GeO_2$) in an $SiO_2$ core of the optical fiber.

When the input electrical signal waveform 1 having a rectangular waveform pulse at a transmission speed of 2.5 Gb/s is generated by the pulse pattern generator 5 and drives the semiconductor laser diode 6, the input optical signal waveform 2 having a rectangular waveform with a transmission speed of 2.5 Gb/s formed by synthesizing the input electrical signal waveform 1 and the light having five oscillation peaks within a wavelength range from 1.305 to 1.310 µm is output from the semiconductor laser diode 6 and is input to the main optical fiber 8 through the isolator 7. The waveform is distorted a little from the rectangular waveform by the characteristics of the semiconductor laser diode 6, but this distortion is not considered here. The input optical signal waveform 2 having a rectangular waveform input to the main optical fiber 8 is transmitted through the main optical fiber 8 and subjected to the dispersive characteristics of the main optical fiber 8. For example, suppose that the dispersive characteristics A in FIG. 1(b) have a dispersion of 17 ps/nm/km at the center wavelength of a band from 1.305 to 1.310 µm. When the light having a wavelength width of $\Delta\lambda=5$ nm travels through a main optical fiber 8 40 km long, the delay is:

17 (ps/nm/km)×5 (nm)×40 (km)=3400 ps, and a dispersed optical waveform 14 including the delay in the input optical signal waveform 2 is output from the main optical fiber 8.

Next, the dispersed optical waveform 14 travels through the dispersion cancelling short distance optical fiber 13 having dispersion characteristics B reverse to the dispersion characteristics A of the main optical fiber 8 whereby the above-described dispersion is cancelled. The optical waveform 14 is reformed as the output optical signal waveform 3 having the same optical waveform as the input optical signal waveform 2 and is input to the photodiode 10 through the optical attenuator 9. The output optical signal waveform 3 is converted into the output electrical signal waveform 4 by the photodiode 10, and the output electrical signal waveform 4 is amplified by the amplifier 11. Thereafter, the code error rate measuring apparatus 12 is used to determine whether a bit error has occurred during transmission within a range that can be corrected.

In this way, the dispersed optical waveform 14 distorted by the dispersive characteristics of the main optical fiber 8 is corrected by the dispersion cancelling short distance optical fiber 13 having the same total dispersion as and in a reverse phase to that of the main optical fiber 8, resulting in the output of a rectangular waveform including no distortion. Here, the establishment of the dispersive characteristics of the dispersion cancelling short distance optical fiber 13 is as described above.

Next, a description will be given of a simulation of this first embodiment. The operation is as described above, and only the main optical fiber 8 and the dispersion cancelling short distance optical fiber 13 used in the simulation and the waveform of the optical signal obtained by this simulation will be described.

The main optical fiber 8 used in this simulation has a dispersive characteristic with a positive inclination so that the dispersion is zero at a wavelength of 1.30 μm and 21 ps/nm/km at a wavelength of 1.55 μm, and it has a length of 70 km and a total dispersion of 1470 ps/nm/km. On the other hand, the dispersion cancelling short distance optical fiber 13 used in this simulation has dispersive characteristics having a negative inclination so that the dispersion is −100 ps/nm/km at a wavelength of 1.55 μm, and it has a length of 14.7 km and a total dispersion of −1470 ps/nm.

First of all, when the semiconductor laser diode 6 is driven by a pulsed signal having a rectangular waveform with a transmission speed of 2.5 Gb/s which is output from the pulse pattern generator 5, an optical signal formed by synthesizing light having a center frequency of 1.55 μm and the described pulsed signal is output from the semiconductor laser diode 6 as the input optical signal waveform 2. When observing this input optical signal waveform 2 as a 0 or 1 level digital signal, although this input optical signal waveform 2 exhibits a sharp pulsed oscillation exceeding the 1 level at its leading edge due to a resonance, it exhibits a steep rise from the 0 level to the 1 level and a steep fall from the 1 level to the 0 level, and a waveform having equal lengths for the 0 level and for the 1 level, that is, a waveform that can be called a rectangular waveform, is obtained.

When the input optical signal waveform 2 obtained is transmitted through the main optical fiber 8 70 km in length, the waveform is transformed to one that rises very smoothly from the 0 level to an intermediate level between the 0 level and the 1 level, rises steeply from the intermediate level to the 1 level, only exceeding the 1 level at a sharp pulsed oscillation part, begins falling at the latter half of the pulsed oscillation, and smoothly returns from the 1 level to the 0 level. Thus, as compared with the input optical signal waveform 2, a triangular waveform 14 having a duration of about one third at the 1 level and quite a long time at the 0 level is obtained.

When this dispersed optical waveform 14 is transmitted to the dispersion cancelling short distance optical fiber 13 according to the first embodiment of the present invention, the output optical signal waveform 3 that is output has the same rectangular waveform as the input optical signal waveform 2.

While the dispersion cancelling short distance optical fiber 13 is connected at the latter stage of the main optical fiber 8, this dispersion cancelling short distance optical fiber 13 may be connected at the prior stage of the main optical fiber 8. In this case, the input optical signal waveform 2 is distorted by the dispersion cancelling short distance optical fiber 13 having dispersive characteristics reverse to those of the main optical fiber 8, and the distorted waveform is reformed by traveling through the main optical fiber 8, whereby the output optical signal waveform 3 is the same waveform as the input optical signal waveform 2 and is obtained at the output end of the main optical fiber 8.

The first embodiment employs the dispersion cancelling short distance optical fiber 13 having dispersive characteristics reverse to those of the main optical fiber 8 connected at the prior or latter stage of the main optical fiber 8 having dispersive characteristics so that the dispersive characteristics of the two optical fibers cancel, reforming the waveform of the optical signal. Accordingly, the output optical signal waveform 3 received by the photodiode 10 becomes the same waveform as the input optical signal waveform 2, thereby eliminating reading errors that are measured and detected by the code error rate measuring apparatus 12. In addition, by employing a short distance fiber as the dispersion cancelling short distance optical fiber 13, loss of the optical signal can be reduced.

Embodiment 2

Figure 2:
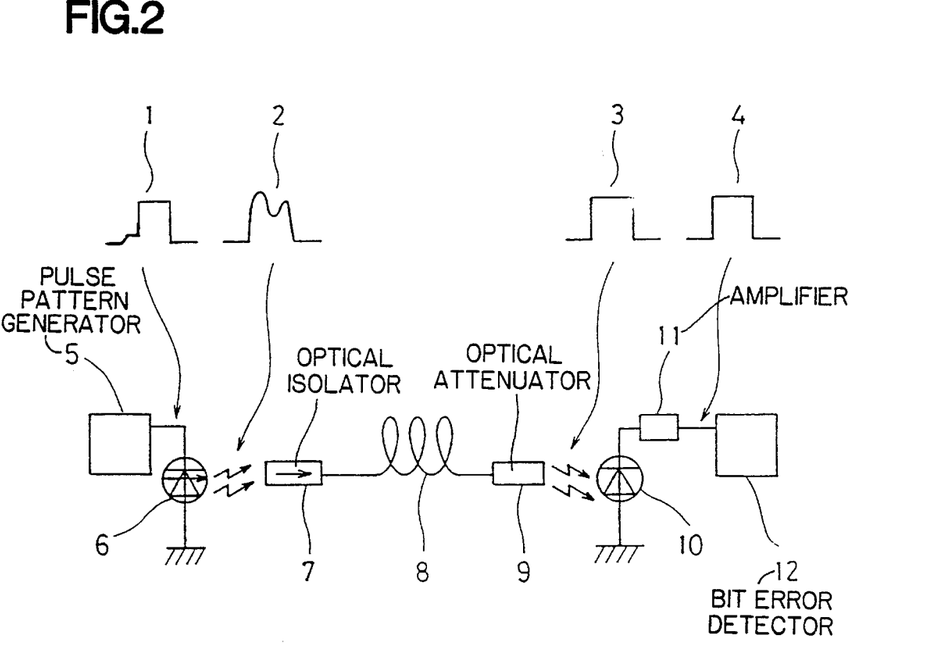
FIG. 2 is a diagram illustrating an optical fiber communication apparatus in which a semiconductor laser diode is driven by an electrical signal having a different pattern, according to a second embodiment of the present invention.

FIG. 2 illustrates an optical fiber communication apparatus according to a second embodiment of the present invention.

In the Figure, a pulse pattern generator 5 generates the input electrical signal waveform 1. A semiconductor laser diode 6 converts the input electrical signal waveform 1 into the input optical signal waveform 2. A photodiode 10 converts the output optical signal waveform 3 into the output electrical signal waveform 4 as an electrical signal. An amplifier 11 amplifies the output electrical signal waveform 4.

First of all, the input electrical waveform 1, an electrical signal generated by the pulse pattern generator 5, causes the semiconductor laser diode 6 to generate the input optical signal waveform 2. The optical signal waveform 4 is influenced by the dispersive characteristics of the main optical fiber 8 while traveling through the main optical fiber 8 having dispersive characteristics and becomes a rectangular waveform. When the semiconductor laser diode 6 is driven by the input electrical signal waveform 1 generated from this pulse pattern generator 5, the input optical signal waveform 2 is output. This input optical signal waveform 2 travels through the isolator 7, and thereafter travels through the main optical fiber 8 having the dispersive characteristics. The input optical signal waveform 2 traveling through the main optical fiber 8 is reformed to a rectangular waveform by the dispersive characteristics of the main optical fiber 8, thereby becoming the output optical signal waveform 3 having a rectangular waveform when it is output from the main optical fiber 8.

Next, the output optical signal waveform 3 having a rectangular waveform is transmitted to the photodiode 10 through the optical attenuator 9. The output optical signal waveform 3 that is transmitted to the photodiode 10 is a rectangular waveform so that the output electrical signal waveform 4 output from the photodiode 10 also has a rectangular waveform. The output electrical signal waveform 4 is amplified by the amplifier 11. Thereafter, it is tested by the code error rate measuring apparatus 12 to determine whether a bit error has occurred during the transmission within a range that can be corrected.

Next, a description will be given of a simulation result of this embodiment. The operation is as described above, and only the main optical fiber 8 used in this simulation, the waveform of the electrical signal, and the waveform of the optical signal obtained from the electrical signal in this simulation will be described.

The main optical fiber 8 used in this simulation has dispersive characteristics having a positive inclination so that the dispersion is zero at a wavelength of 1.30 μm and 21 ps/nm/km at a wavelength of 1.55 μm. The fiber has a length of 30 km and a total dispersion of 630 ps/nm.

First of all, the waveform of a pulsed signal at a transmission speed of 2.5 Gb/s output from the pulse pattern generator 5 is not a precise rectangular waveform as generated in the first embodiment but a waveform in which the rising part is a little distorted and is the input electrical signal wave-form 1. More particularly, in the distorted rectangular waveform the time for the 1 level digital signal is set to one half of the time for the 1 level of the output optical signal waveform 3 obtained after transmission through the main optical fiber 8. The rise of the waveform is made smooth to rise to about one fourth of its amplitude from the 0 level to the 1 level, and afterwards the level is held at 1 for a predetermined time. The rising of a rectangular waveform is exhibited, and the falling of the waveform is the same as that of a precise rectangular waveform as in the first embodiment. Thus, a waveform having approximately a rectangular waveform but involving a little distortion is employed as the input electrical signal wave-form 1.

When the semiconductor laser diode 6 is driven by the input electrical signal waveform 1, an optical signal synthesizing the light having a center wavelength of 1.55 μm and the above-described pulsed signal is output from the semiconductor laser diode 6 as the input optical signal waveform 2 in this second embodiment. This input optical signal wave-form 2 is not a rectangular waveform at all but has a rise similar to that of the above-described input electrical signal waveform 1 and a sharp pulsed oscillation, exceeding the 1 level at the rise thereof, corresponding to the rising part of the rectangular waveform of the input electrical signal waveform 1 due to the resonance phenomenon, and returns to the 0 level smoothly in approximately the same time as the falling of the rectangular waveform of the input electrical signal waveform 1.

Next, while traveling through the main optical fiber 8 of 30 km length having a dispersion of 21 ps/nm/km at a wavelength of 1.55 μm, the input optical signal waveform 2 is affected by a total dispersion of 630 ps/nm in the main optical fiber 8, so that this input optical signal waveform 2 is output from the main optical fiber 8 as the output optical signal waveform 3.

The waveform of the output optical signal waveform 3 is reformed to a waveform that can be called a rectangular waveform exhibiting a steep rise and a steep fall and having the same times for the 0 level and the 1 level while remaining a pulsed oscillation due to the resonance phenomenon at its rise.

As described above, this second embodiment employs a construction in which the input electrical signal waveform 1 that causes the semiconductor laser diode 6 to generate the input optical signal waveform 2 is generated by the pulse pattern generator 5, which waveform 2 is reformed to the output optical signal waveform 3 having a rectangular waveform because of the dispersive characteristics of the main optical fiber 8. The output optical signal waveform 3 reformed to a rectangular waveform is received by the photodiode 10 and is converted to the output electrical signal waveform 4 having a rectangular waveform, eliminating reading errors that are detected by the code error rate measuring apparatus 12.

Embodiment 3

Figure 3:
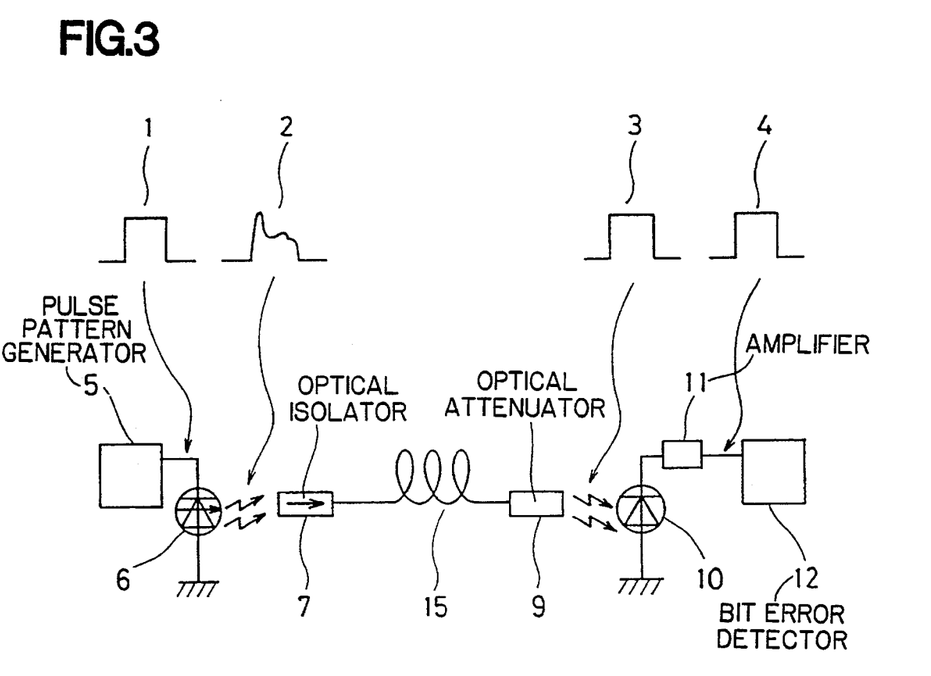
FIG. 3 is a diagram illustrating an optical fiber communication apparatus employing a waveform reforming optical fiber according to a third embodiment of the present invention.

FIG. 3 illustrates an optical fiber communication apparatus according to a third embodiment of the present invention.

In the figure, a pulse pattern generator 5 generates the input electrical signal waveform 1. A semiconductor laser diode 6 converts the input electrical signal waveform 1 into the input optical signal waveform 2. A photodiode 10 converts the output optical signal waveform 3 into the output electrical signal waveform 4. An amplifier 11 amplifies the output electrical signal waveform 4. Reference numeral 15 designates a waveform reforming optical fiber having an entire length of several tens to several hundreds of km.

The input electrical signal waveform 1 as a rectangular waveform pulse having a transmission speed of 2.5 Gb/s is generated by the pulse pattern generator 5. When the semiconductor laser diode 6 is driven by the input electrical signal waveform 1, the input optical signal waveform 2 having a rectangular waveform with a transmission speed of 2.5 Gb/s is output from the semiconductor laser diode 6. Here, when the semiconductor laser diode 6 is driven by a pulse having a rectangular waveform with a speed within a range from 1.0 to 5.0 Gb/s, it causes a relaxation oscillation, thereby generating the input optical signal waveform 2 as an optical signal including a large distortion. The input optical signal waveform 2 is input through the isolator 7 to the waveform reforming optical fiber 15 having a length of several tens to several hundreds of km and having dispersive characteristics. The light including distortion input to the optical fiber 15 is reformed by the optical fiber 15 and is output as the output optical signal waveform 3 having a rectangular waveform. The output optical signal waveform 3 having a rectangular waveform that is reformed is input to the photodiode 10 through the optical attenuator 9 and is converted to the output electrical signal waveform 4 by the photodiode 10. The output electrical signal waveform 4 is amplified by the amplifier 11 and is received by the code error measuring apparatus 12.

Next, a description will be given of a simulation of this third embodiment.

The operation is as described above, and only the waveform reforming optical fiber 15 used in this simulation, the waveform of the electrical signal, and the waveform of the optical signal obtained from the electrical signal in this simulation will be described.

The waveform reforming optical fiber 15 used in this simulation is an optical fiber having dispersive characteristics with a positive inclination so that the dispersion is zero at a wavelength of 1.30 μm and −17 ps/nm/km at a wavelength of 1.55 μm, and it has a total dispersion of −340 ps/nm and a length of 20 km. This dispersive characteristic is realized by varying the amount of an impurity ($GeO_2$) in the core of the optical fiber comprising $SiO_2$ as in the dispersion cancelling short distance optical fiber 13 used in the first embodiment.

First of all, when the semiconductor laser diode 6 is driven by the input electrical signal waveform 1 as a pulsed signal with a transmission speed of 2.5 Gb/s which is output from the pulse pattern generator 5, the input optical signal waveform 2 as an output signal of the semiconductor laser diode 6 includes distortion in which the time for the 1 level is shortened due to the relaxation oscillation of the semiconductor laser diode 6, and the falling to the 0 level at its skirt part is not steep but quite smooth.

Next, when this input optical signal waveform 2 including distortion is transmitted through the waveform reforming optical fiber 15, a waveform approximately the same as the input electrical signal waveform 1 is output at the output end.

As described above, this third embodiment employs a construction in which the relaxation oscillation generated by the semiconductor laser diode 6 when the semiconductor laser diode 6 is driven at 2.5 Gb/s is cancelled by the waveform reforming optical fiber 15 having dispersive characteristics, thereby reforming the waveform. Therefore, an optical communication apparatus having no reading errors for output signals is produced. More particularly, a waveform reforming apparatus that can be utilized for an evaluation test for testing an apparatus provided at the receiving side of an optical fiber communication apparatus is produced.

What is claimed is:

1. A method of optical fiber communication using an apparatus comprising a signal transmission line for transmitting a communication signal comprising a main optical fiber having dispersive characteristics including a total dispersion; a semiconductor laser diode for outputting an optical signal having a wavelength and transmitted from an input end to an output end of said signal transmission line; and a photodiode for receiving the optical signal output from the output end of said signal transmission line the method comprising:

driving said semiconductor laser diode with an amplitude-distorted rectangular waveform electrical signal to output an optical signal having a rectangular amplitude waveform at the output end of said signal transmission line as a result of the dispersive characteristics of said main optical fiber.

2. A method of optical fiber communication using an apparatus comprising a signal transmission line for transmitting a communication signal comprising a main optical fiber having dispersive characteristics including a total dispersion; a semiconductor laser diode for outputting an optical signal having a wavelength and transmitted from an input end to an output end of said signal transmission line; and a photodiode for receiving the optical signal output from the output end of said signal transmission line, the method comprising;

driving said semiconductor laser diode with an electrical signal having a transmission speed of approximately 1 Gb/s, thereby generating relaxation oscillation of said semiconductor laser to output an optical signal having a distorted non-rectangular waveform and reforming the distorted waveform to a rectangular waveform in said signal transmission line having dispersive characteristics at the output end of said signal transmission line.

* * * * *